(12) United States Patent
Yamagishi

(10) Patent No.: US 6,837,582 B2
(45) Date of Patent: Jan. 4, 2005

(54) IMAGE ADJUSTER OF PROJECTOR AND IMAGE ADJUSTING METHOD OF IMAGE DISPLAY

(75) Inventor: Eiichi Yamagishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 112 days.

(21) Appl. No.: 10/384,538

(22) Filed: Mar. 11, 2003

(65) Prior Publication Data
US 2003/0184714 A1 Oct. 2, 2003

(30) Foreign Application Priority Data
Mar. 26, 2002 (JP) ..................... 2002-087004

(51) Int. Cl.$^7$ ............ G03B 21/00; G03B 21/14; G03B 21/26; G09B 5/08; H04N 17/02
(52) U.S. Cl. ............ 353/30; 353/69; 353/121; 353/122; 345/150; 348/180; 348/184
(58) Field of Search ............ 353/30, 69, 70, 353/121, 122; 345/150; 348/180, 184, 745

(56) References Cited

U.S. PATENT DOCUMENTS 5,854,613 A * 12/1998 Soltan et al. ............ 345/32
5,923,315 A * 7/1999 Ueda et al. ............ 345/581

* cited by examiner

Primary Examiner—Judy Nguyen
Assistant Examiner—Melissa J Koval
(74) Attorney, Agent, or Firm—Oliff & Berridge, PLC

(57) ABSTRACT

An image adjuster of a projector (100) has a projection surface onto which a projection image of the projector (100) is projected, a reference tone image generator for generating a plurality of reference tone images on the projection surface as an adjustment reference, an image signal inputter (41) for inputting an image signal including a tone signal corresponding to the plurality of reference tone images for simultaneously displaying a plurality of tone images on the projector (100) to be adjusted, an image importing device for simultaneously importing the plurality of reference tone images and the plurality of tone images projected by the projector (100) as an image data; an image processor (42) for conducting image-processing based on the imported image data; and a correction data generator (43) for generating image-display correction data of the projector (100) based on the result of the image-processing.

6 Claims, 9 Drawing Sheets

IMAGE ADJUSTER OF PROJECTOR AND IMAGE ADJUSTING METHOD OF IMAGE DISPLAY

BACKGROUND OF THE INVENTION

1. Field of the Invention

The present invention relates to an image adjuster for adjusting an image projected by a projector having a light source, an electric optical device for modulating a light beam irradiated by the light source in accordance with image information and a projection optical system for enlarging and projecting the light beam modulated by the electric optical device, and an image adjusting method for adjusting an image displayed by an image display having an electric optical device for forming an optical image in accordance with inputted image signal.

2. Description of Related Art

Image display such as a CRT display, liquid crystal display, organic electroluminescence display and plasma display and projection image display such as liquid crystal projector and a projector having a micro-mirror as a modulator has an individual difference on γ characteristics representing tone of displayed image relative to the voltage inputted to the electric optical device for forming an image.

Accordingly, γ correction is usually conducted on the respective image displays for determining γ characteristics of the respective image displays and displaying constant tone image in accordance with the inputted image signal before being shipped.

In order to conduct γ correction of a projector as a projection image display, a predetermined tone signal has been conventionally inputted on a projector to be adjusted step by step and the image projected in accordance with the respective tone signals is measured with a point sensor such as a calorimeter. Base on the measurement result, the input voltage necessary for obtaining tone signal corresponding to the inputted tone signal is calculated to generate a correction data.

The obtained correction data is stored as a lookup table where the tone signal and the corresponding inputted voltage are recorded in a storage of the projector.

When a tone signal is inputted while the projector is actuated, a MPU of the projector searches in the lookup table in the storage to fetch an input voltage in accordance with the tone signal and the voltage is inputted in the electric optical device to display an image, thereby forming appropriate display image in accordance with the tone signal.

However, in order to determine the γ characteristics using the point sensor, the process of measuring the projected image based on a tone signal with the point sensor to generate a correction data and switching to the next tone signal for measuring with a point sensor has to be repeated, so that it takes considerable time for determining the γ characteristics and generating all the correction data. Specifically, in order to determine the γ characteristics, the inputted tone signal has to be compared with the measurement result on at least thirty-three tones, which requires switching and measurement using the point sensor at thirty-three steps.

Further, in an image display such as a projector for forming projected image by modulating a light beam irradiated by a light source, metal halide lamp, high-pressure mercury lamp etc. are used as the light source. However, light-emitting condition of such light source may sometimes be changed and the image projected when the respective tone signals are inputted is influenced by the light-emitting condition of the light source. Accordingly, the respective tone signals may not be compared under the same condition, and the γ characteristics cannot be determined with high accuracy.

SUMMARY OF THE INVENTION

An object of the present invention is to provide an image adjuster of a projector and an image adjusting method of an image display capable of determining γ characteristics with high speed and accuracy and generating correction data within a short time.

An image adjuster according to an aspect of the present invention adjusts a projection image of a projector, the projector comprising a light source, an electric optical device that modulates the light beam irradiated by the light source in accordance with image information and a projection optical system that enlarges and projects the light beam modulated by the electric optical device, the image adjuster including: a projection surface onto which the projection image of the projector is projected; a reference tone image generator that generates a plurality of reference tone images on the projection surface as an adjustment reference; an image signal input means that inputs an image signal including a tone signal corresponding to the plurality of reference tone images, the image signal simultaneously displaying a plurality of tone images on the projector to be adjusted; an image importing device that simultaneously imports the plurality of reference tone images and the plurality of tone images projected by the projector as image data; an image processor that conducts image-processing of the image data imported by the image importing device; and a correction data generator that generates image display correction data of the projector based on the result of the image-processing by the image processor.

According to the above aspect of the present invention, since the plurality of the reference tone images and the plurality of tone images projected by the projector can be simultaneously imported by the image importing device, the reference tone images and the projected tone images can be image-processed by the image processor to determine the γ characteristics thereof. Accordingly, there is no need for conducting measurement using a point sensor each time the tone image is switched for each tone image, thus speedily determining the γ characteristics of the projector.

Further, since the plurality of projected tone images are simultaneously imported by the image importing device, the plurality of tone images and the plurality of reference tone images can be highly accurately compared without being influenced by light-emission dispersion of the light source.

Since the γ characteristics can be determined with high speed and accuracy, the highly accurate correction data can be generated within a short time by the correction data generator.

In the above, the correction data generator may preferably correct an input signal inputted to the electric optical device in accordance with the difference between the tone images projected in accordance with the tone signal corresponding to the reference tone images and the reference tone images.

The input signal is a drive voltage signal of an optical component of the electric optical device.

By correcting the input signal as in the above, the projected tone image can be approximated to the reference tone image, so that the appropriate tone image corresponding to the input tone signal can be displayed overcoming the individual difference of the electric optical device.

In the above, when the projector has a correction data storage that stores the correction data generated by the correction data generator, the image adjuster may further have a correction data writer that writes the correction data generated by the correction data generator on the correction data storage.

Since such correction data writer is provided, the generated correction data can be automatically written on the storage of the projector, the image of the projector can be more speedily adjusted.

Further, the image importing device may preferably have a two-dimensional image pickup device capable of taking image of a predetermined area of the projection surface and a signal converter that converts the image signal taken by the two-dimensional image pickup device into a signal compatible with a computer.

Since the image is imported by the two-dimensional image pickup device, the plurality of tone images and the plurality of reference tone images can be simultaneously imported. The imported image is converted into digital signal compatible with a computer by the signal converter, so that the digital image-processing can be conducted by the image processor, thereby easily generating correction data.

The above plurality of reference tone images can be constructed as so-called gray scale having a continuous plurality of reference tone images and the reference tone image generator may display the gray scale on the projection surface as an image. However, the reference tone image generator may preferably have a reference scale composed of a plurality of reference tone images formed by printing on the projection surface.

Since the reference scale is constantly displayed on the projection surface by arranging the reference tone image as the above reference scale, the plurality of tone images projected by the projector can be easily compared with the reference scale, thus preventing the structure of the device from being complicated.

An image adjusting method according to another aspect of the present invention adjusts a displayed image of an image display including an electric optical device that generates an optical image in accordance with inputted image signal, the method including the steps of: inputting an image signal including a tone signal corresponding to a plurality of reference tone images to the image display to be adjusted to simultaneously display a plurality of tone images on the image display; importing the plurality of reference tone images and the displayed plurality of tone images as image data; conducting image-processing of the imported image data; and generating a correction data of the image display based on the result of the image-processing.

The same function and advantages as described above can be obtained by the above aspect of the present invention.

DETAILED DESCRIPTION OF PREFERRED EMBODIMENT(S)

An embodiment of the present invention will be described below with reference to attached drawings.

(1-1) Structure of Projector to be Adjusted

Figure 1:
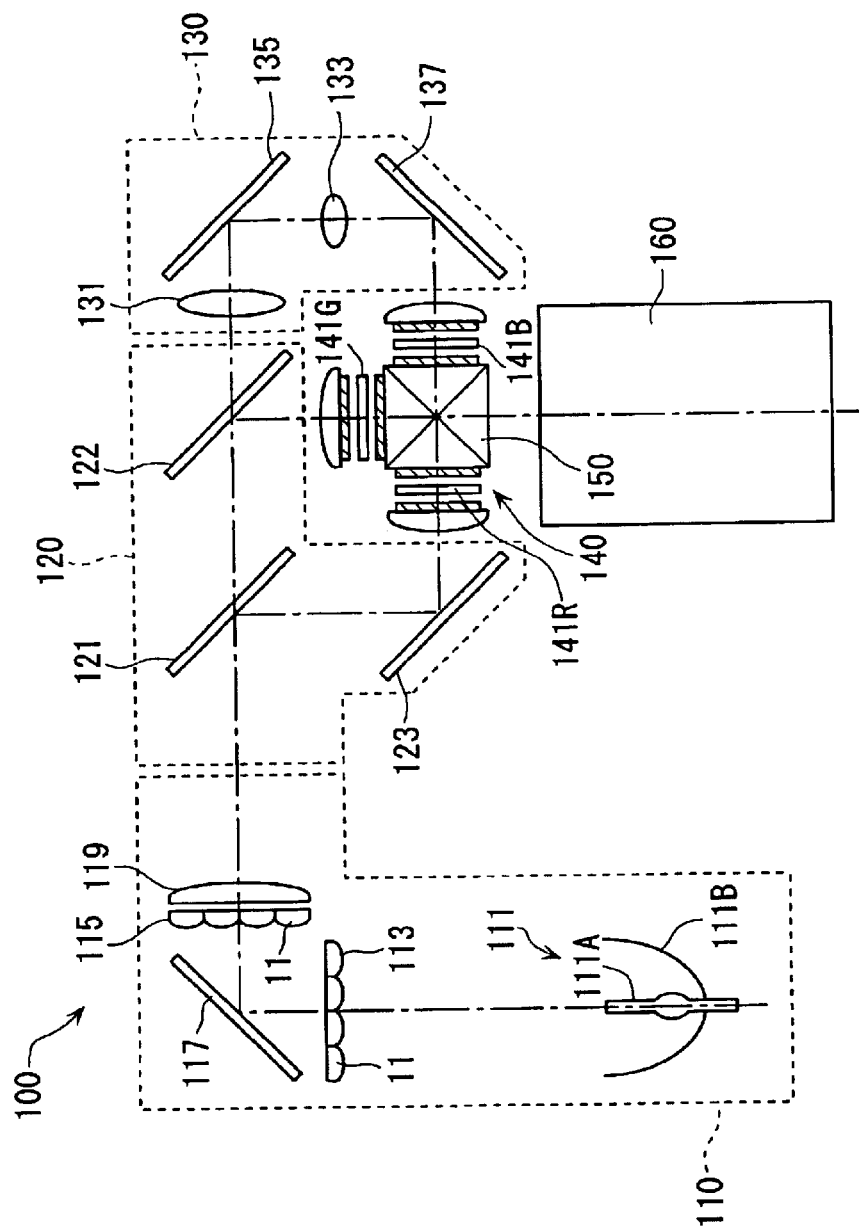
FIG. 1 is a schematic illustration showing a structure of a projector to be adjusted in an embodiment of the present invention.

FIG. 1 shows a structure of a projector 100 to be adjusted by the image adjuster of a projector according to the present invention. The projector 100 has an integrator illuminating optical system 110, a color separating optical system 120, a relay optical system 130, an electric optical device 140, a cross dichroic prism 150 as a color combining optical device and a projection lens 160.

The integrator illuminating optical system 110 has a light source 111 including a light source lamp 111A and a reflector 111B, a first lens array 113, a second lens array 115, a reflection mirror 117, and a superposing lens 119. After the irradiation direction of the light beam irradiated by the light source lamp 111A is aligned by the reflector 111B, the light beam is split into a plurality of sub-beams by the first lens array 113. Thereafter, the irradiation direction is bent by a bending mirror by ninety degrees of the light beam to be focused around the second lens array 115. The respective sub-beams irradiated by the second lens array 115 enter on the superposing lens 119 so that the central axis (main beam) becomes orthogonal with the incident-side of the superposing lens 119. The plurality of sub-beams irradiated by the superposing lens 119 are focused on three liquid crystal panels 141R, 141G and 141B of the electric optical device 140.

The color separating optical system 120 has two dichroic mirrors 121 and 122 and a reflection mirror 123, the mirrors 121, 122 and 123 separating the plurality of sub-beams irradiated by the integrator illuminating optical system 110 into three color lights of red, green and blue.

The dichroic mirror 121 disposed on the upstream of the optical path reflects light of red light wavelength and transmits light of green and blue light wavelength, and the dichroic mirror 122 reflects the light of green light wavelength and transmits blue light wavelength.

The relay optical system 130 has an incident-side lens 131, a relay lens 133 and reflection mirrors 135 and 137, which guides the color light separated by the color separating optical system 120, blue light for instance, toward the liquid crystal panel 141B.

The electric optical device 140 has three liquid crystal panels 141R, 141G and 141B, which uses a polysilicon TFT as a switching element. The color lights separated by the color separating optical system 120 are modulated by the three liquid crystal panels 141R, 141G and 141B in accordance with image information to form an optical image.

The cross dichroic prism 150 as a color combining optical system combines the image modulated for respective color lights irradiated by the three liquid crystal panels 141R, 141G and 141B to form a color image. The color image combined by the cross dichroic prism 150 is irradiated by the projection lens 160 to be enlarged and projected on a screen.

(1–2) Structure of Signal Processing System of Projector

Figure 2:
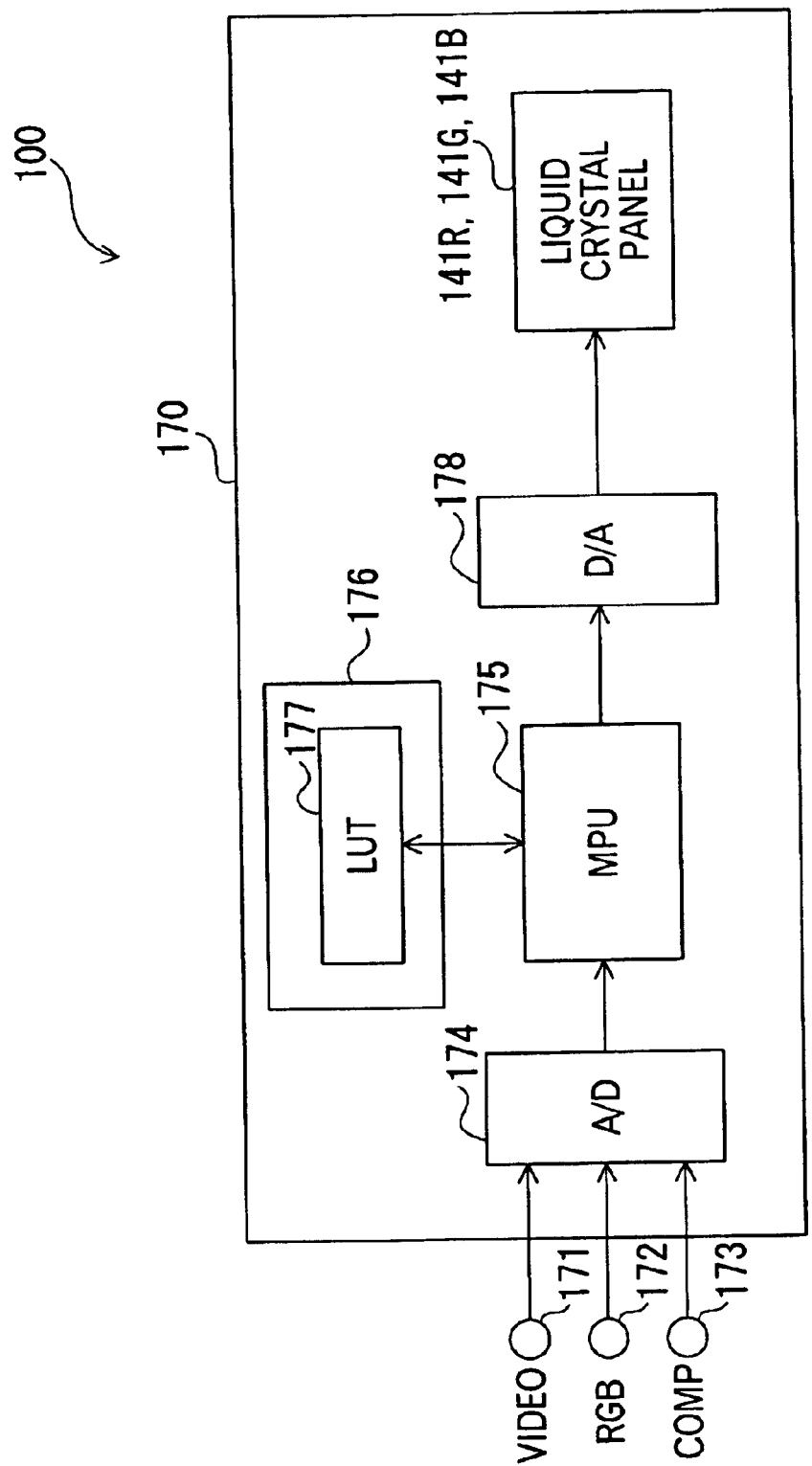
FIG. 2 is a block diagram showing a signal processing system of a projector to be adjusted in the aforesaid embodiment.

The projector 100 having the above optical system has input terminals of various signals. Specifically, the projector 100 has an input terminal for composite signal such as NTSC signal of a television etc., an input terminal for RGB signal such as a computer etc., and an input terminal for component signal such as HDTV and DVD, and the signal inputted from the respective terminals are processed by a signal processing system 170 shown in FIG. 2.

The signal processing system 170 of the projector 100 has a composite signal input terminal 171 for a composite signal VIDEO is inputted, a RGB signal input terminal 172 for a RGB signal to be inputted, a component signal input terminal 173 for a component signal COMP to be inputted, an A/D converter 174, a MPU (Micro Processor Unit) 175, a memory 176, a LUT (LookUp Table) 177 and a D/A converter 178.

The A/D converter 174 converts the analog signal inputted by the signal input terminals 171 to 173 into a digital signal, which converts tone of the image supplied as an analog signal into digitized tone value and outputs to the MPU 175.

The MPU 175 obtains appropriate drive voltage of the liquid crystal panels 141R, 141G and 141B in accordance with the tone value from the A/D converter 174, the obtained drive voltage being outputted to the D/A converter 178.

The memory 176 is constructed by involatile memory such as EEPROM and flash memory, which has record area having the LUT 177 where the inputted tone value and the drive voltage of the liquid crystal panels 141R, 141G and 141B are related (described below in detail). Incidentally, the LUT 177 includes three tables for the respective liquid crystal panels 141R, 141G and 141B.

The D/A converter 78 converts the drive voltage calculate by the MPU 175 into an analog signal and the converted analog signal is outputted to the liquid crystal panels 141R, 141G and 141B so that the liquid crystal panels 141R, 141G and 141B is driven by the drive voltage.

(2) Structure of Image Adjuster of Projector

Figure 3:
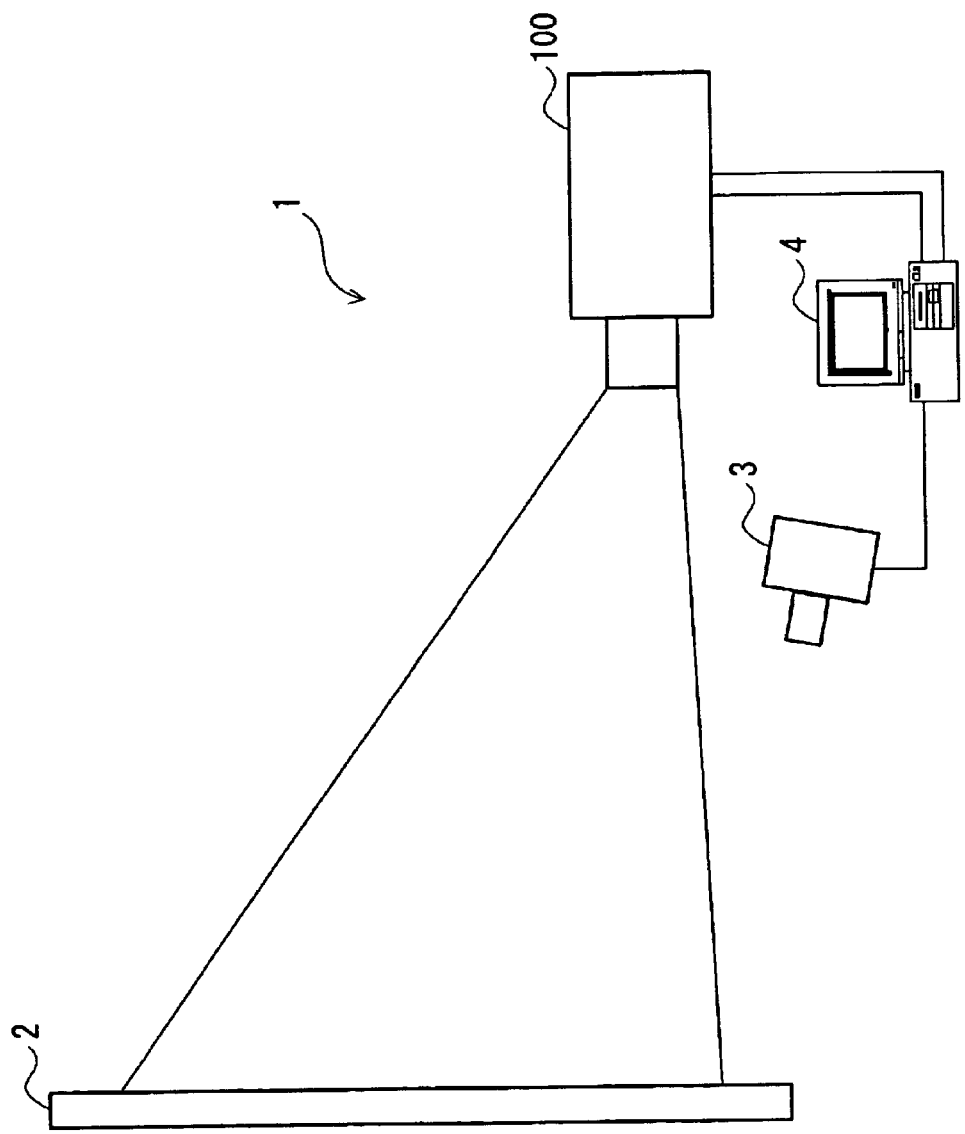
FIG. 3 is a schematic illustration showing a structure of an image adjuster of the aforesaid embodiment.

FIG. 3 shows an outline of the structure of an image adjuster 1 according to an embodiment of the present invention.

The image adjuster 1 determines the γ characteristics of the projector 100 to be adjusted and generates the correction data for projecting appropriate tone image in accordance with tone indicated by the image signal, the data being written on the memory 176 of the projector 100, which includes a projection surface 2, a two-dimensional image pickup device 3 as an importing device, and a measurement controller 4.

(2–1) Structure of Projection Surface and Image Importing Device

Figure 4:
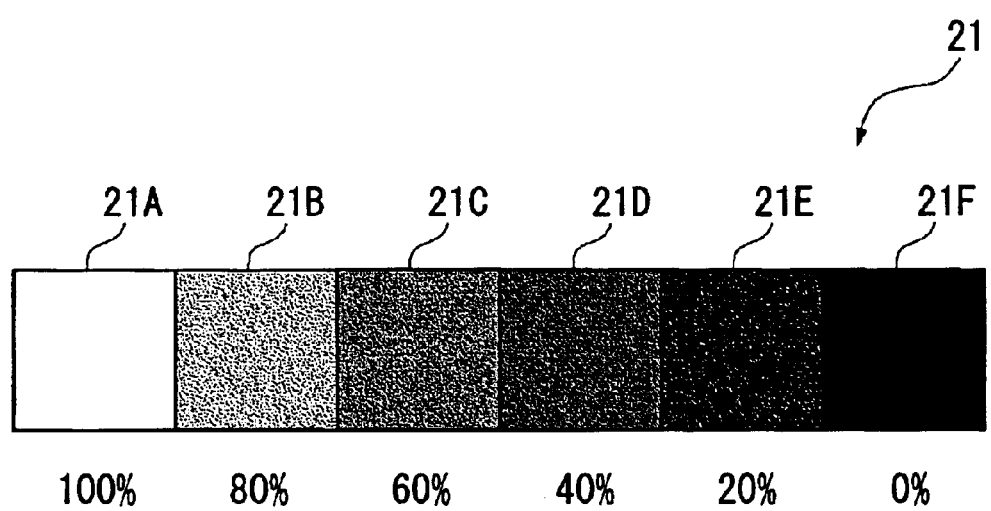
FIG. 4 is an illustration of a reference scale of the image adjuster of the aforesaid embodiment.

The projection surface 2 is a screen onto which the light beam irradiated by the projector 100 is projected, which is provided with a gray scale 21 as a reference scale at the center thereof by printing etc. as shown in FIG. 4.

The gray scale 21 has a linearly-arranged plurality of reference tone images 21A, 21B, 21C, 21D, 21E and 21F having different tones. The reference tone image 21A represents an image of 100% transmissivity, i.e. white image, and the reference tone image 21F represents an image of 0% transmissivity, i.e. black image. Incidentally, though only reference tone images of six steps are shown in the present embodiment, the gray scale has approximately thirty-three steps for taking and simultaneously evaluating images of thirty-three reference tones.

The two-dimensional image pickup device 3 is an area sensor such as a CCD (Charge-Coupled Device) sensor, which can simultaneously import images of a predetermined area including the gray scale 21 on the projection surface 2.

Figure 5:
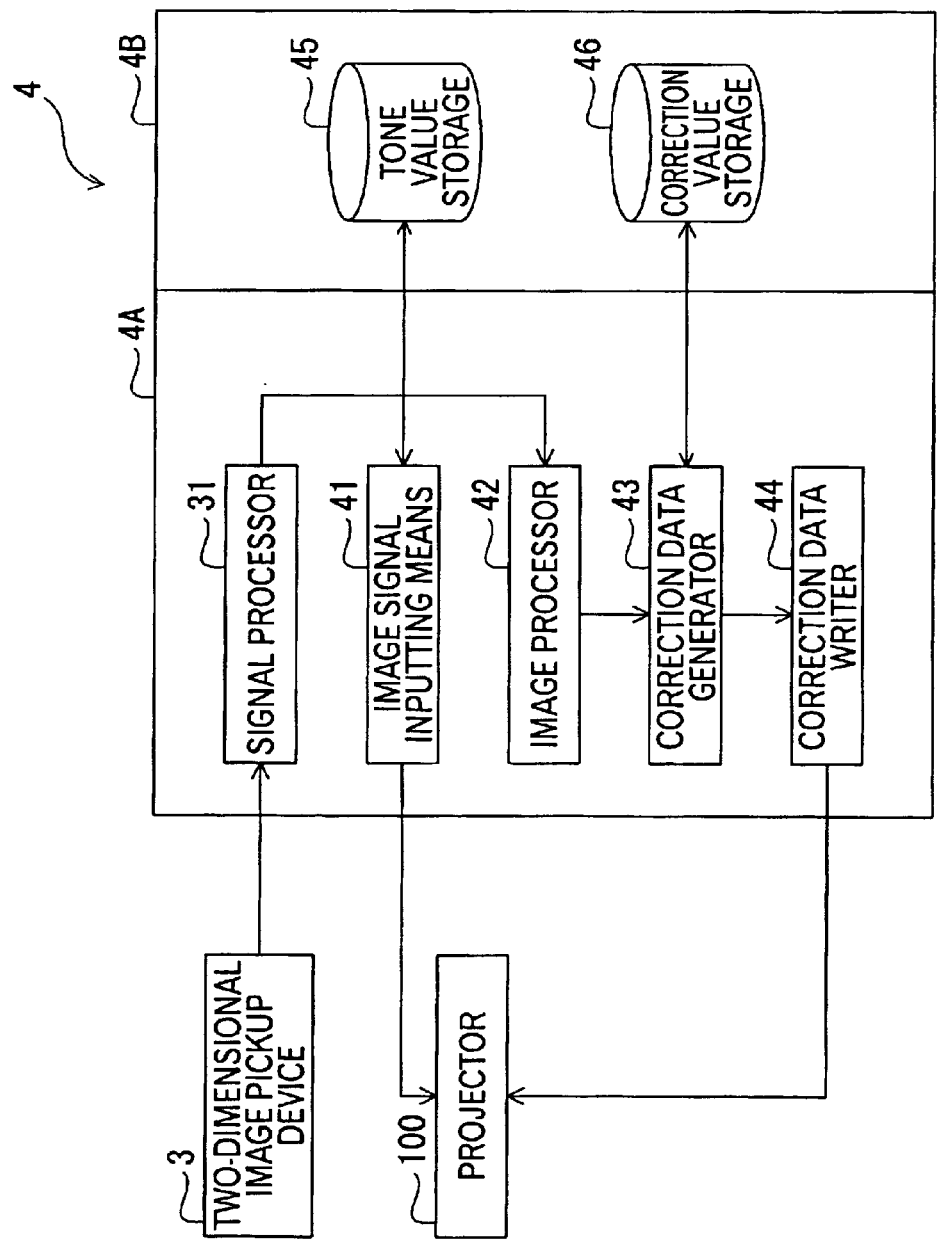
FIG. 5 is a block diagram showing a structure of a measurement controller of the image adjuster of the aforesaid embodiment.

The image signal imported by the two-dimensional image pickup device 3 is outputted to the measurement controller 4 through an image processor 31 as shown in FIG. 5.

The signal processor 31 converts the image signal imported by the two-dimensional image pickup device 3 to be compatible with a computer, which specifically is a video capturing board attached to rear side of a computer and the like.

The two-dimensional image pickup device 3 and the signal processor 31 are the image importing device.

(2–2) Structure of Measurement Controller

The measurement controller 4 analyzes the image taken by the two-dimensional image pickup device 3, inputs the image signal including a predetermined tone signal to the projector 100 and writes the generated correction data to the memory 176 of the projector 100.

As shown in FIG. 5, the measurement controller 4 is a computer having a processor 4A and a storage 4B. Though not shown in FIG. 5, an input device such as a keyboard and a mouse and an output device such as a display and a printer are connected to the measurement controller 4.

The measurement controller 4 has an image signal inputting means 41, an image processor 42, a correction data generator 43 and a correction data writer 44 as a program operated on an OS (Operating System) for controlling the entire device including the processor 4A.

A tone value storage 45 and a correction value storage 46 are provided in the storage 4B as a predetermined area.

The image signal inputting means 41 inputs the image signal including a plurality of tone signals corresponding to the reference tone images 21A, 21B, 21C and 21D of the gray scale 21 shown in FIG. 4, where the projector 100 having received the image signal simultaneously displays a plurality of tone images corresponding to the plurality of tone signals on the projection surface 2 (described below in detail).

The image processor 42 analyzes the image data inputted through the signal processor 31, which conducts pattern-matching processing within an image taken by the two-dimensional image pickup device 3 to determine the area for obtaining the luminance and calculates average luminance etc. within the area.

The correction data generator 43 determinesγ characteristics of the projector 100 to be adjusted based on the result of image processing by the image processor 42 to generate the correction data based thereon.

Specifically, the correction data generator 43 calculates deviations of the respective tones based on the tone image projected by the projector 100 and the reference tone images 21A, 21B, 21C, 21D, 21E and 21F, generates a drive voltage to eliminate difference between the two tone images, and creates LUT storing the drive voltage for each tone.

The correction data writer 44 writes the final correction data generated by the correction data generator 43 to the memory 176 of the projector 100 as the LUT 177.

The tone value storage 45 stores the tone signal inputted from the image signal inputting means 41 to the projector 100 and the calibration data of the two-dimensional image pickup device 3 in taking the image of the gray scale 21, where the tone data corresponding to the reference tone images 21A, 21B, 21C, 21D, 21E and 21F of the gray scale 21 and calibration value data being related to the respective tones are stored.

The correction value storage 46 stores the correction value of the respective tone images while obtaining the γ characteristics of the projector 100 by the correction data generator 43, where the tone value included in the image signal inputted by the image signal inputting means 41 and the correction value of the tone value are stored.

(3) Image Adjusting Step of Projector

Figure 6:
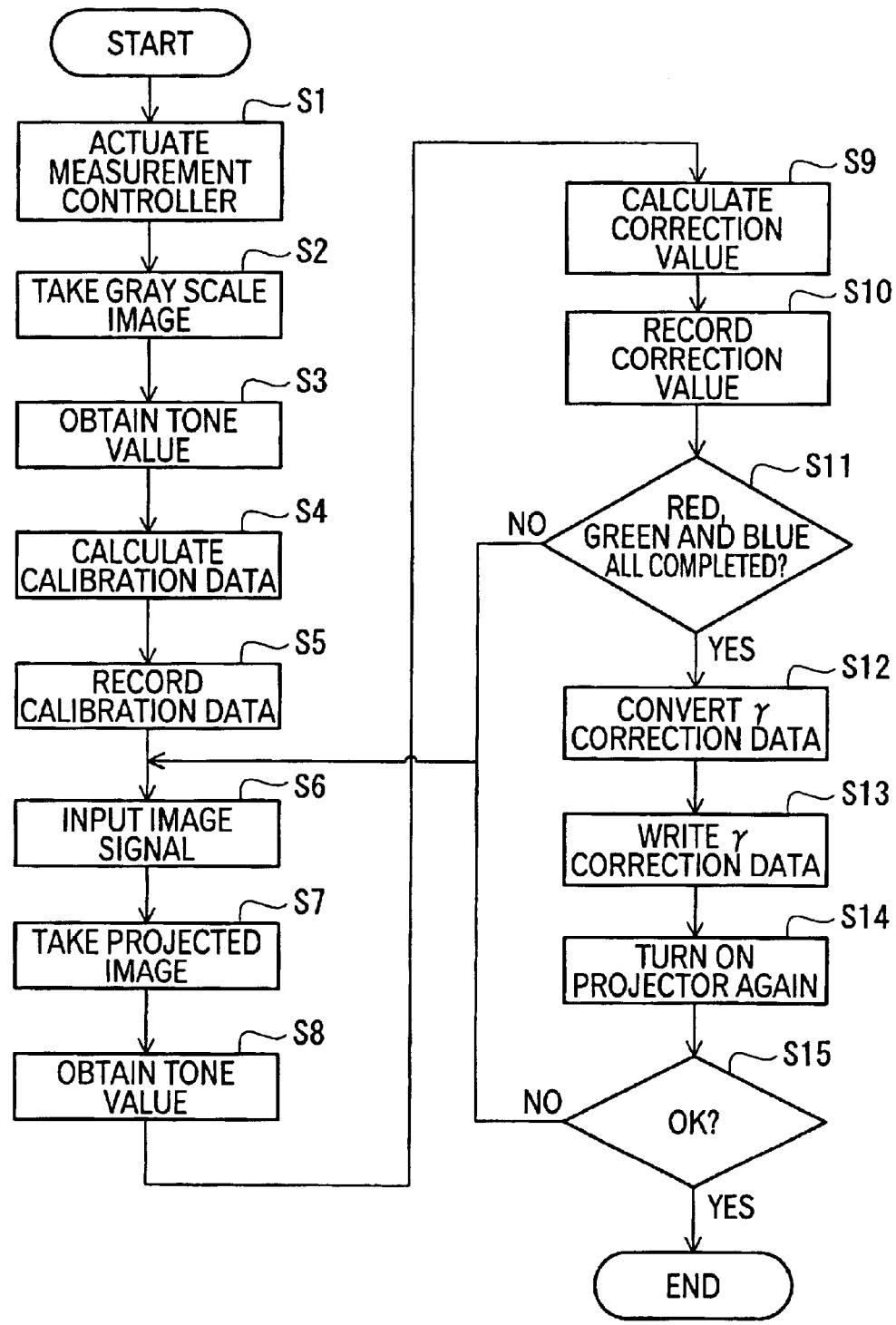
FIG. 6 is a flowchart showing a process of an image adjusting method by the image adjuster of the aforesaid embodiment.

Next, image adjusting step of the projector 100 using the above image adjuster 1 will be described below with reference to the flowchart shown in FIG. 6.

Figure 7:
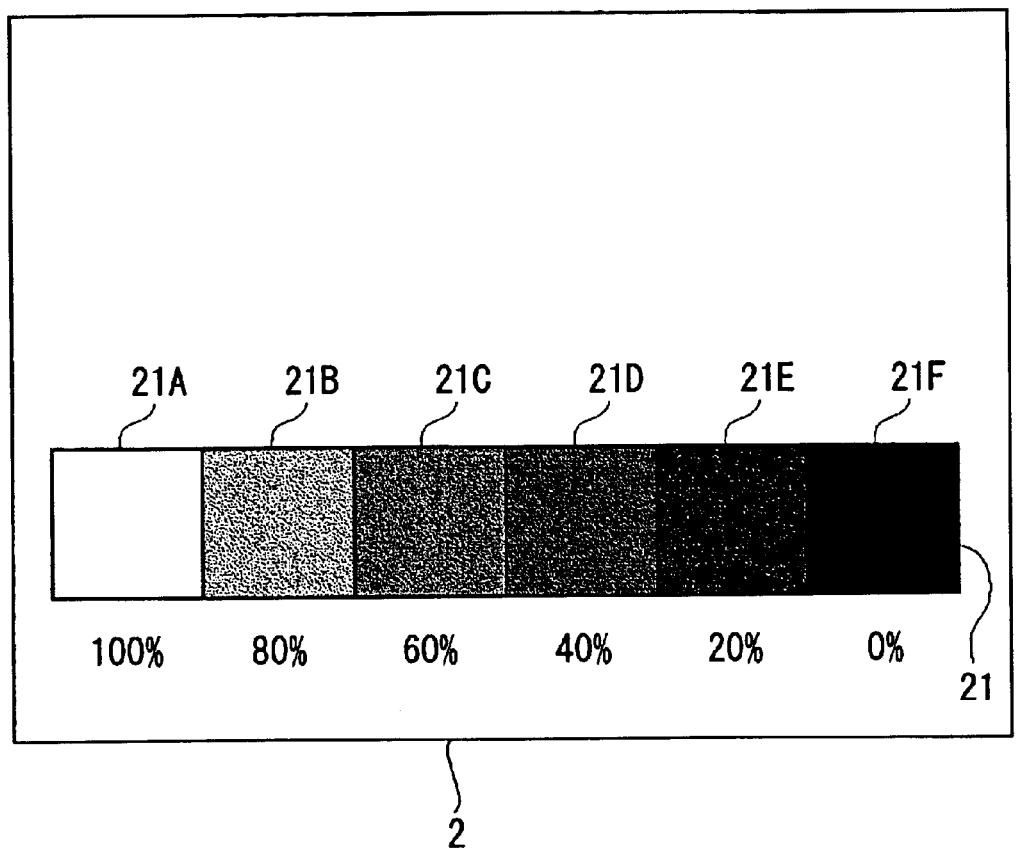
FIG. 7 is an illustration showing an image on a screen when a reference scale is illuminated in the aforesaid embodiment.
Figure 8:
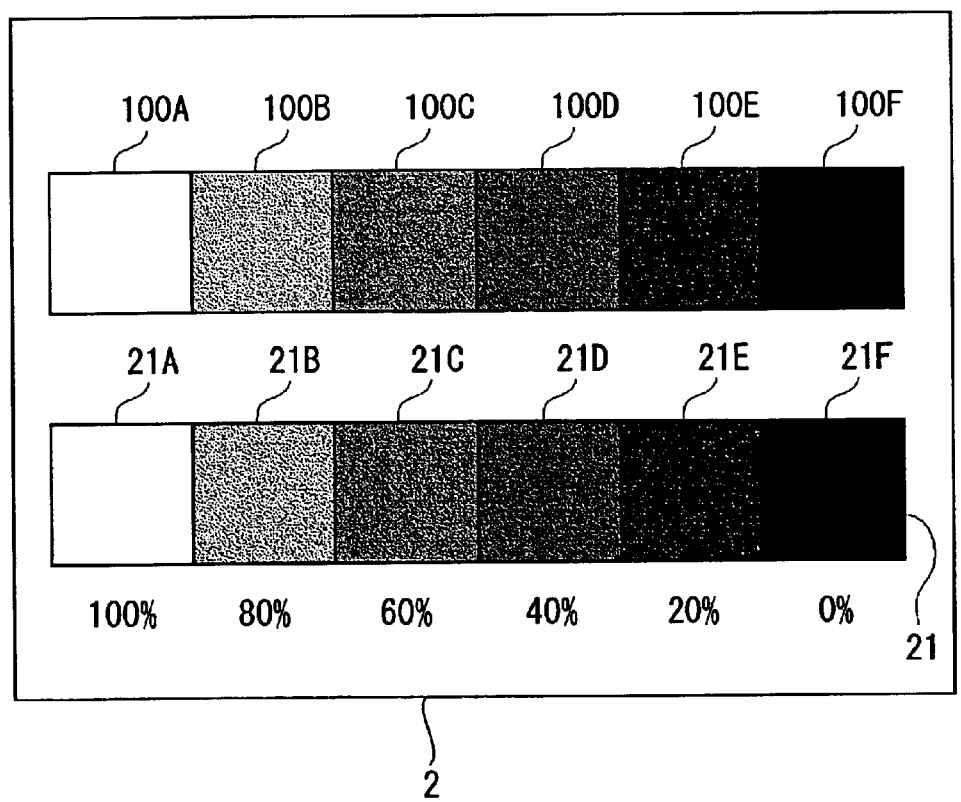
FIG. 8 is an illustration showing an image displayed on the screen when a plurality of tone images are displayed above the reference scale in the aforesaid embodiment.

(3–1) When the measurement controller 4 is actuated (step S1), the light source of the projector 100 is turned on to illuminate the gray scale 21 on the projection surface 2 as shown in FIG. 7 and the image of the gray scale 21 taken by the two-dimensional image pickup device 3 is imported into the measurement controller 4 through the signal processor 31 (step S2). At this time, the projection image from the projector 100 is an image of 100% transmissivity, i.e. the white image.

(3–2) The image processor 42 obtains a tone value L(n) of the respective reference tone images of the gray scale 21 (step S3) and stores the tone value L(n) in the tone value storage 45.

(3–3) The image processor 42 calculates a calibration data H(n) based on the obtained tone value L(n) and the original tone value R(n) of the reference tone images 21A to 21F, according to the following formula (1) (step S4).

$$H(n)=R(n)-R(n) \quad (1)$$

(3–4) The image processor 42 stores the calibration data H(n) corresponding to the calculated tone value to the tone value storage 45 (step S5) and complete calibration of the measurement controller 4.

(3–5) The image signal inputting means 41 inputs an image signal including the tone signal corresponding to the reference tone image of the gray scale 21 (step S6) and projects the tone images 100A to 100F above the reference tone images 21A to 21F of the gray scale 21 as shown in FIG. 7. Incidentally, since the projector 100 has the three liquid crystal panels 141R, 141G and 141B, the image signal inputting means 41 initially inputs the image signal on the liquid crystal panel 141G for modulating green light. The image projected by the projector 100 is only the image of the tone images 100A to 100F and white pattern is projected on the other area on the projection surface 2, at least on the area of the gray scale 21A to 21F.

(3–6) The image processor 42 obtains the projected tone images 100A to 100F of FIG. 7 through the two-dimensional image pickup device 3 and the signal processor 31 and a tone value M(n) of the respective tone images 100A to 100F and outputs the obtained tone value M(n) to the correction data generator 43.

(3–7) The correction data generator 43 stores the obtained tone value M(n) to the correction value storages 46 and calculates a correction value N(n) using the calibration data H(n) stored in the tone value storage 45 based on the following formula (2) (step S9), the calculated correction value being stored in the correction value storage (46) (step S10).

$$N(n)=M(n)-H(n) \quad (2)$$

(3–8) When all the correction values are calculated for the liquid crystal panel 141G, the same process is applied on the liquid crystal panel 141R to calculate the correction value and the steps from inputting the image signal to storing the correction value are repeated until the correction values of all the liquid crystal panels 141R, 141G and 141B are obtained (step S11).

(3–9) When all the correction values are calculated, the correction data generator 43 determines the γ characteristics of the respective liquid crystal panels based on the correction value N(n) stored in the correction value storage 46 to convert into γ correction data (step S12). Specifically, when the γ characteristics of the liquid crystal panels 141R, 141G and 141B are determined as in a graph G1 shown in FIG. 9, the correction data generator 43 changes a drive voltage V of respective tone values T to be graph G2 to obtain the γ correction data. The γ correction data is constructed as a LUT where the respective tone values are related to the drive voltage.

(3–10) When the γ correction data is generated by the correction data generator 43, the correction data writer 44 writes the generated γ correction data on the memory 176 of the projector 100 as the LUT 177 (step S13).

(3–11) When the LUT 177 is written on the memory 176 of the projector 100, the image signal inputting means 41 inputs an image signal including a plurality of tone signals into the projector 100 to project the tone image 100A to 100F on the projection surface 2 (step S14). The image processor 42 obtains the tone value by importing the projected image through the two-dimensional image pickup device 3 and the signal processor 31 to check the projected image after the γ correction data is written. If the image is not projected as desired, the whole process is ended. On the other hand, if the image is not projected as desired, the steps S6 to S13 are repeated again to generate and write Y correction data to the projector 100 (step S15).

(4) Advantage of Embodiment

According to the above-described embodiment, following advantages can be obtained.

(4–1) Since the plurality of reference tone images 21A to 21F and the plurality of tone images 100A to 100F projected by the projector 100 can be simultaneously imported into the measurement controller 4 by the two-dimensional image pickup device 3 and the signal processor 31, the corresponding reference tone images 21A to 21F and the projected tone images 100A to 100F can be processed by the image processor 42 to determine the γ characteristics. Accordingly, it is not necessary to measure the image by the point sensor each time the tone image is switched for the respective tone images, thereby speedily determining the γ characteristics of the projector 100.

(4–2) Since the projected plurality of tone images 100A to 100F are simultaneously imported by the two-dimensional image pickup device 3 and the signal processor 31, the plurality of tone images 100A to 100F can be compared with the plurality of reference tone images 21A to 21F without being influenced by the light-emission dispersion of the light source etc, thereby speedily determining the γ characteristics of the projector 100. Since the γ characteristics can be determined with high speed and accuracy, highly accurate correction data can be generated by the correction data generator 43 within a short time.

Figure 9:
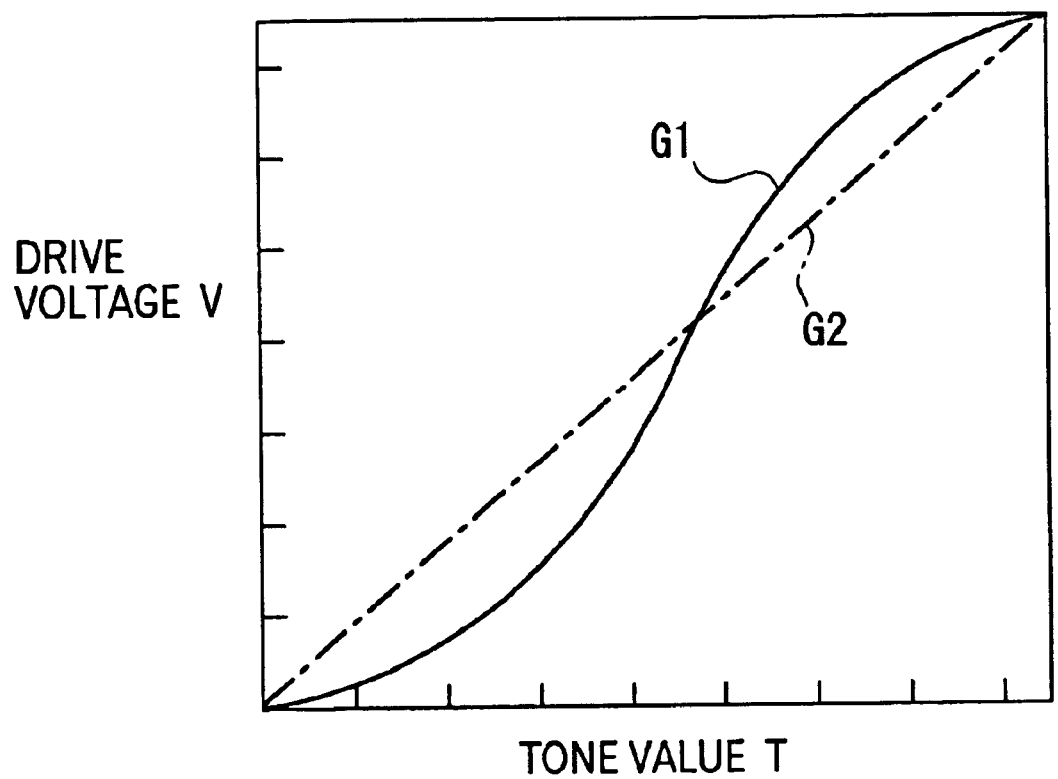
FIG. 9 is a graph showing γ characteristics obtained by the projection tone image to be adjusted in the aforesaid embodiment.

(4–3) Since the γ correction data for correcting the drive voltage signal V is generated by determining the γ characteristics G1 of the projector 100 as shown in FIG. 9, the projected tone images 100A to 100F can be approximated to the reference tone images 21A to 21F, thereby eliminating individual difference of the liquid crystal panels 141R, 141G and 141B of the electric optical device 140 to display an appropriate tone image in accordance with the inputted tone signal.

(4–4) Since the correction data writer 44 is provided, the generated γ correction data can be written on the memory 176 of the projector 100, so that the image of the projector 100 can be more speedily adjusted.

(4–5) Since the image is imported using the two-dimensional image pickup device 3, the plurality of tone images 100A to 100F and the plurality of reference tone images 21A to 21F can be simultaneously imported. Since the imported image is converted into a digital signal compatible with a computer by the signal processor 31, the digital image processing can be conducted by the image processor 42, thus simplifying generating process of the correction data.

(4–6) Since the gray scale 21 is constantly displayed on the projection surface 2 by arranging the reference tone image as the gray scale 21 printed on the projection surface 2, the plurality of tone images 100A to 100F projected by the projector 100 can be easily compared with the gray scale 21, thus avoiding the structure of the device from being complicated.

(4–7) Since the sequence of the steps S6 to S10 and the step S12 are conducted in adjusting the image of the projector 100, the γ characteristics G1 can be determined by simultaneously obtaining the different tone values with the two-dimensional image pickup device 3, thus calculating the γ correction data with high speed and accuracy.

(4–8) Since the γ correction data is written during the step S13, the series of steps for adjusting the image of the projector 100 can be automatically conducted, thus efficiently adjusting the image.

(5) Modification of Embodiment

Incidentally, the scope of the present invention is not restricted to the above embodiments, but includes following modifications.

Though the gray scale 21 is directly printed on the projection surface 2 to generate the reference tone image, the arrangement is not limiting. For instance, another projector recorded with γ correction data in advance is separately prepared, and the reference tone image may be displayed by inputting the image signal including the same tone signal as the projector to be adjusted. Alternatively, the reference tone image generator may be an LED array of stable luminance having different density in accordance with the tone on the projection surface, thereby constructing a plurality of reference tone images.

Though the image adjuster 1 is used for obtaining the γ correction data of the three-plate type projector 100 in the above embodiment, the projector may be a single-plate type. The electric optical device for modulating the light may not be the liquid crystal panels 141R, 141G and 141B but the image adjuster of the present invention may be used for obtaining the γ correction data of the electric optical device using a micro-mirror.

Though the image adjusting method of the present invention is used for adjusting the image of the projection-type projector 100, the image adjusting method may be applied for obtaining γ correction data of directly-displaying type image display such as a liquid crystal display and a plasma display.

Specific arrangement, process and configuration in implementing the present invention may be designed in any manner as long as an object of the present invention can be achieved.

What is claimed is:

1. An image adjuster that adjusts a projection image of a projector, the projector comprising a light source, an electric optical device that modulates the light beam irradiated by the light source in accordance with image information and a projection optical system that enlarges and projects the light beam modulated by the electric optical device, the image adjuster comprising:

a projection surface onto which the projection image of the projector is projected;

a reference tone image generator that generates a plurality of reference tone images on the projection surface as an adjustment reference;

an image signal input means that inputs an image signal including a tone signal corresponding to the plurality of reference tone images, the image signal simultaneously displaying a plurality of tone images on the projector to be adjusted;

an image importing device that simultaneously imports the plurality of reference tone images and the plurality of tone images projected by the projector as image data;

an image processor that conducts image-processing of the image data imported by the image importing device; and a correction data generator that generates image display correction data of the projector based on the result of the image-processing by the image processor.

2. The image adjuster of a projector according to claim 1, wherein the correction data generator corrects an input signal inputted to the electric optical device in accordance with the difference between the tone images projected in accordance with the tone signal corresponding to the reference tone images and the reference tone images.

3. The image adjuster of a projector according to claim 1, the projector having a correction data storage that stores the correction data generated by the correction data generator;

the image adjuster further comprising a correction data writer that writes the correction data generated by the correction data generator on the correction data storage.

4. The image adjuster of a projector according to claim 1, wherein the image importing device has a two-dimensional image pickup device capable of taking image of a predetermined area of the projection surface and a signal converter that converts the image signal taken by the two-dimensional image pickup device into a signal compatible with a computer.

5. The image adjuster of a projector according to claim 1, wherein the reference tone image generator has a reference scale composed of a plurality of reference tone images formed by printing on the projection surface.

6. An image adjusting method that adjusts a displayed image of an image display including an electric optical device that generates an optical image in accordance with inputted image signal, the method comprising the steps of:

inputting an image signal including a tone signal corresponding to a plurality of reference tone images to the image display to be adjusted to simultaneously display a plurality of tone images on the image display;

importing the plurality of reference tone images and the displayed plurality of tone images as image data;

conducting image-processing of the imported image data; and generating a correction data of the image display based on the result of the image-processing.

* * * * *